United States Patent Office 3,426,072
Patented Feb. 4, 1969

3,426,072
PREPARATION OF AMINE ETHERS
Glenn H. Warner, St. Albans, W. Va., assignor to Union Carbide Corporation, a corporation of New York
No Drawing. Filed Aug. 17, 1966, Ser. No. 572,918
U.S. Cl. 260—584  9 Claims
Int. Cl. C07c 93/02

The invention relates to an improved process for producing bis[beta-(N,N-dimethylamino)alkyl] ethers. These amine ethers, and in particular bis[2-(N,N-dimethylamino)ethyl] ether, have been found to be very useful catalysts for the production of urethane foams. In copending application Ser. No. 414,454, filed Nov. 27, 1964 in the name of Fedor Poppelsdorf and assigned to the same assignee as this application, there is described a highly efficient two-step process for producing these amine ethers. In the first step of said process, trimethylamine is reacted with bis(beta-haloalkyl) ether to form the bis-methohalide of bis[beta-(N,N-dimethylamino)alkyl] ether. In the second step, the bis-methohalide of bis[beta-(N,N-dimethylamino)alkyl] ether is reacted with dimethylamine to form the desired amine ether product. However, there are several economic disadvantages inherent in the said second step. First, this step is carried out at superatmospheric pressure, for example up to 300 p.s.i.g., which necessitates the use of high pressure, corrosion-resistant equipment. Large quantities of trimethylamine and dimethylamine are formed during the second step and care must be taken to prevent these volatile materials from polluting the atmosphere. A third disadvantage is that the procedure required to isolate the amine ether product is rather tedious.

The present invention is based upon the discovery that the amine ethers can readily be produced by reacting a high boiling primary amine with the bis-methohalide of bis[beta-(N,N-dimethylamino)alkyl] ether. The procedure eliminates the necessity to use dimethylamine and because of this, atmospheric or even reduced pressure can be employed for the reaction. Also, the desired amine ether product can readily be recovered from the reaction mixture by simple fractional distillation.

The starting reactants that are employed in the subject invention include the bis-methohalide of bis[beta-(N,N-dimethylamino)alkyl] ether, preferably the bis-methochloride of bis[beta-(N,N-dimethylamino)alkyl] ether, wherein the alkyl is ethyl or 1-methylethyl. Specific illustrative examples include the bis-methochloride of bis[beta-(N,N-dimethylamino)ethyl] ether, the bis-methochloride of bis-[1-methyl-2-(N,N-dimethylamino)ethyl] ether, the bis-methochloride of 2-(N,N-dimethylamino)ethyl 1'-methyl-2'-(N,N-dimethylamino)ethyl ether, the bis-methoiodide of bis[1-methyl-2-(N,N-dimethylamino)ethyl] ether, the bis-methoiodide of bis[2-(N,N - dimethylamino)ethyl] ether, and the bis-methobromide of bis[1-methyl-2-(N,N-dimethylamino)ethyl]ether. The bis-methochlorides of bis-[beta-(N,N-dimethylamino)alkyl] ethers are preferred for economic reasons.

The primary amines that are employed in the invention are those primary amines that have boiling points above about 220° C. and preferably above about 240° C. These primary amines can have (in addition to at least one primary amino group) secondary amino, tertiary amino, oxy, or hydroxyl substituents. The preferred primary amines are the high boiling alkylene amines that are represented by Formula I:

I  H$_2$N—R—(RX)$_n$H wherein R represents ethylene or propylene, X represents oxy(—O—), imino(—NH—), or N-methylimino

and wherein $n$ represents a number having a value of at least one and up to, for example, 8 or more provided that when all the R variables are ethylene and when all the X variables are imino, $n$ is at least two. Specific illustrative amines that are represented by Formula I include triethylenetetramine, tetraethylenepentamine, pentaethylenehexamine, hexaethyleneheptamine, imino - bis(propylamine, N-methyl-bis(aminopropyl)amine, N-aminoethylethanolamine, N-aminoethyl-propanolamine, and the like. The higher polyalkylene polyamines are normally mixtures of several materials including some cyclic compounds (e.g., piperazine derivatives). Such mixtures are well known in the art and are intended to be included in the invention even though Formula I does not specifically call for such cyclic compounds.

The process of the invention is carried out by reacting the bis-methohalide of bis[beta-(N,N-dimethylamino) alkyl] ether with the primary amine. The proportions of the reactants can vary over a fairly wide range. It is preferred, however, to employ at least a slight excess of amine. Therefore, the reactants are preferably employed at a ratio such that there is provided at least 2 primary amino groups per mole of bis-methohalide of bis[beta-(N,N-dimethylamino)alkyl] ether. A large excess of amine can also be employed and this is desirable at times so that the amine can act as a solvent or diluent for the reaction. When the amine is employed as a diluent the preferred proportion is from about 3.5 to 7 moles of amine per mole of bis-methohalide of bis-[beta-(N,N-dimethylamino)alkyl] ether.

A desirable method for carrying out the invention is to slowly add the bis-methohalide of bis[beta-(N,N-dimethylamino)alkyl] ether in aqueous solution to the stirred amine. The reaction is carried out at an elevated temperature preferably between about 130° and 190° C. While temperatures above and below this range can be used, above 190° C. the amine ethers tend to slowly decompose and at temperatures below 130° C. the reaction becomes uneconomically slow. The reaction can be carried out at atmospheric or subatmospheric pressure. Subatmospheric pressure of from about 75 to about 150 mm. of mercury is generally preferred in order to facilitate the removal of the amine ether product by distillation as it is formed. When the aqueous solutions of bis-methohalide of bis-[beta-(N,N-dimethylamino)alkyl] ether is added to the reaction mixture the water in said solution immediately begins to distill. Shortly thereafter the product amine ether will begin to distill at a slightly higher temperature (the exact temperature will depend upon the pressure employed and the nature of the components of the reaction mixture). The reaction is preferably continued until substantially all of the bis-methohalide of bis[beta-(N,N-dimethylamino)alkyl] ether is converted to the desired amine ether product. This normally takes from about ½ to about 2 hours. The product as directly recovered from the reaction mixture is normally impure and therefore is preferably redistilled through a conventional fractionating column to recover the pure product.

If desired, the reaction can be carried out in an inert diluent in order to facilitate the solubility of the bis-methohalide of bis[beta-(N,N-dimethylamino)alkyl] ether in the amine. Illustrative examples of such diluents include diethylene glycol, triethylene glycol or various glycol ethers such as the monomethyl ether of diethylene glycol, which have boiling points about about 220° C.

The amine ethers that are produced by the process of this invention are highly useful catalysts for the production of urethane foams.

The examples which follow illustrate the invention:

Example 1

Aminoethylethanolamine (AEEA), 1000 g. (9.43 moles) and 500 g. of the bis-methochloride of bis[2-

(N,N-dimethylamino)ethyl] ether (71 percent aqueous solution; 1.31 moles contained bis-methochloride) which had been previously prepared in large quantity, were charged to a still equipped with a stirrer and a column packed with stainless-steel turnings and having an efficiency of 5 theoretical plates. The mixture was heated to 75° C. at this temperature, the solids which formed on mixing the AEEA and bis-methochloride dissolved, and water began to distil from the reaction vessel. As the temperature of the mixture was increased, the following distillation data was obtained.

| Fraction | Head temperature, °C. | Kettle temperature, °C. | Weight, g. |
| --- | --- | --- | --- |
| 1 | to 95 | 75–125 | 180 |
| 2 | 95–125 | 125–155 | 84 |
| 3 | 125–130 | 155–185 | 119 |
| 4 | 130–110 | 185–190 | 56 |

Fraction #3 was identified as bis[2-(N,N-dimethylamino) ethyl] ether by gas chromatographic retention time and a tertiary amine analysis of 11.85 meq./g. The theoretical value for tertiary amine content is 12.48 meq./g. Redistillation of this material through a 36-inch, laboratory, spinning-band column gave 109 g. of bis[2-(N,N-dimethylamino)ethyl] ether, boiling point 189–191° C. at 760 mm., having a tertiary amine content of 12.40 meq./g. Fractions 1 and 2 were combined and treated with an equal weight of 50 percent sodium hydroxide. The organic phase which separated was then combined with Fraction 4 and the resulting mixture was redistilled through the spinning band column to yield an additional 30 g. of bis[2-(N,N-dimethylamino)ethyl] ether having a tertiary amine content of 12.39 meq./g. Total overall yield of bis[2-(N,N-dimethylamino)ethyl] ether of 138 g. or 65.8 percent of theoretical based on contained bis-methochloride.

Example 2

The reaction of AEEA with the bis-methochloride by the previously described procedure was repeated, but the reaction was run at 140 mm. pressure. The residual AEEA was then utilized for the reaction with a second charge of bis-methochloride. In this fashion, 1000 g. of 71% aqueous bis-methochloride (2.62 moles) was reacted in two batches with 1000 g. of AEEA (9.42 moles) to give 367 g. of crude bis[2-(N,N-dimethylamino)ethyl] ether. Distillation of this crude amine-ether through a packed column with an efficiency of 7 theoretical plates, yielded 283 g. of bis[2-(N,N-dimethylamino)ethyl] ether, B.P. 130–135° C./130 mm., with a tertiary amine content of 12.39 meq./g. The yield based on bis-methochloride was 67 percent.

Example 3

Bis-methochloride of bis[beta-(N,N-dimethylamino) alkyl] ether (500 g. of 71 percent aqueous solution), was fed into 450 g. (4.25 moles) aminoethylethanolamine at 125° C. and a pressure of 140 mm. Distillate was stripped from the mixture as it formed and collected over the temperature range of 65–150° C. The crude distillate, 520 g., was then combined with 120 g. of toluene and the mixture was refluxed through a column fitted with a decanter having an efficiency of 7 theoretical plates until all the water had been removed. Toluene was then distilled from the dried solution. Distillation of the residue at 130 mm. gave 150 g. of bis[2-(N,N-dimethylamino)ethyl] ether, B.P. 122–127° C./130 mm., having a tertiary amine content of 12.41 meq./g.

The yield based on bis-methochloride was 71 percent.

Example 4

Bis-methochloride of bis[beta-(N,N-dimethylamino) alkyl] ether (250 g. of 71 percent aqueous solution), was fed into 225 g. of triethylenetetramine at 120° C. The resulting mixture was then heated to 150° C. under 140 mm. pressure. Distillate was removed from the reaction mixture as it formed; two fractions were collected. The first fraction, boiling over the range 60–128° C., was treated with an equal of caustic solution (50 percent) and the organic material which separated was combined with the second fraction. Distillation of the composite material through the spinning band column gave 73 g. of bis[2-(N,N-dimethylamino)ethyl] ether, B.P. 128–131° C./ 130 mm., having a total alkalinity of 12.42 meq./g. The yield based on methochloride was 70.8 percent.

In an article by Humig and Baron, Chemishe Ber. 90, 395–407 (1957) there is disclosed a process wherein monoethanolamine was employed to recover tertiary amines from alkyltrimethylammonium halides. Attempts to employ monoethanolamine in the subject inventive process were not successful, as is illustrated by the following example:

Example 5

A mixture of 300 g. of diethylene glycol and 170 g. (2.82 moles) monoethanolamine was heated to 70° C. and 500 of the bis-methochloride of bis[2-N,N-dimethylamino)ethyl] ether (71 percent aqueous solution, 1.31 moles contained bis-methochloride) was added. The mixture was heated to 150° C. at atmospheric pressure and the water distilled from the reaction system (120 g. of water were collected). The resulting mixture was heated at reflux temperature (155° C.) for 90 minutes. Then distillate was stripped from the mixture at 140 mm. pressure over the temperature range from 80–150° C. This crude material (140 g.) was redistilled through the spinning band column at reduced pressure, but this distillation did not yield any bis[2-N,N-dimethylamino)ethyl] ether.

What is claimed is:

1. Process which comprises reacting (a) the bis-methohalide of a bis[beta-(N,N-dimethylamino)alkyl] ether wherein the alkyl is ethyl or 1-methylethyl with (b) a primary amine having a boiling point at atmospheric pressure of at least about 220° C., for a period of time and at an elevated temperature sufficient to produce as the product a bis[beta - (N,N - dimethylamino)alkyl] ether, and subseqentuly recovering said product.

2. The process of claim 1 wherein the reaction temperature is in the range of from about 130° to 190° C.

3. The process of claim 1 wherein the process is carried out at about atmospheric or at sub-atmospheric pressure.

4. The process of claim 1 wherein the reactant (a) is a bis-methochloride.

5. The process of claim 1 wherein the primary amine is a composition of the formula:

$$H_2N—R—X—(RX)_nH$$

wherein R represents ethylene or propylene, wherein X represents oxy, imino, or N-methylimino, and wherein $n$ represents a number having a value of from 1 to about 8 provided that when all of the R variables are ethylene and when all of the X variables are imino, $n$ is at least 2.

6. The process of claim 1 wherein the product is recovered by distillation from the reaction mixture.

7. The process of claim 1 wherein reactant (a) is the bis-methochloride of bis[2 - (N,N - dimethylamino)ethyl] ether.

8. The process of claim 1 wherein the primary amine is aminoethylethanolamine.

9. The process of claim 1 wherein the primary amine is triethylenetetramine.

References Cited

UNITED STATES PATENTS 1,919,301   7/1933   Morton.

CHARLES B. PARKER, Primary Examiner.

R. L. RAYMOND, Assistant Examiner.

U.S. Cl. X.R.

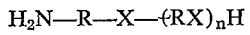

252—426